United States Patent
Iijima et al.

(10) Patent No.: US 9,036,164 B2
(45) Date of Patent: May 19, 2015

(54) IMAGE RECORDING DEVICE

(75) Inventors: Shota Iijima, Nagoya (JP); Iwane Sano, Obu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 150 days.

(21) Appl. No.: 13/614,511

(22) Filed: Sep. 13, 2012

(65) Prior Publication Data

US 2013/0135641 A1 May 30, 2013

(30) Foreign Application Priority Data

Nov. 28, 2011 (JP) ................................. 2011-259145

(51) Int. Cl.
*G06K 15/16* (2006.01)

(52) U.S. Cl.
CPC ....................... *G06K 15/16* (2013.01)

(58) Field of Classification Search
None
See application file for complete search history.

(56) References Cited

U.S. PATENT DOCUMENTS

| 4,769,674 | A | * | 9/1988 | Kitajima et al. | 399/84 |
| 5,986,775 | A | * | 11/1999 | Yoshimizu | 358/496 |
| 7,280,773 | B2 | * | 10/2007 | Uno | 399/27 |

FOREIGN PATENT DOCUMENTS

JP H07-232842 A 9/1995

* cited by examiner

*Primary Examiner* — Ashish K Thomas
(74) *Attorney, Agent, or Firm* — Baker Botts L.L.P.

(57) ABSTRACT

A feeder feeds a first recording medium in a first direction. A curved guide guides the first recording medium fed by the feeder upward along a first path. An upper guide receives a leading edge of the first recording medium, guided by the curved guide, and guides the first recording medium in a second direction substantially opposite to the first direction. An insertion guide guides, along a second path, a second recording medium inserted from an opening. A conveying unit disposed downstream of the upper guide in the second direction conveys the first recording medium and the second recording medium to a recording unit which records an image on each recording medium supported by a supporting unit. A deflecting member has a surface inclined with respect to the second direction and deflects a leading edge of the second recording medium, guided by the insertion guide, upward toward the upper guide.

11 Claims, 8 Drawing Sheets

IMAGE RECORDING DEVICE

CROSS REFERENCE TO RELATED APPLICATION

This application claims priority from Japanese Patent Application No. 2011-259145, filed on Nov. 28, 2011, the entire disclosure of which is incorporated herein by reference.

BACKGROUND OF THE INVENTION

1. Field of the Invention

The present invention relates to an image recording device configured to record an image on a recording medium and particularly to an image recording device in which a recording medium is fed selectively from a feed tray and a manual feed tray.

2. Description of Related Art

A known image recording device comprises a feed tray, a manual feed tray, and a recording unit. A recording sheet fed from the feed tray is conveyed along a first path to the recording unit. A recording sheet inserted from the manual feed tray is conveyed along a second path to the recording unit.

SUMMARY OF THE INVENTION

A need has arisen for an image recording device configured to record an image of good quality on a recording medium selectively fed from a feed tray and a manual feed tray.

According to an embodiment of the invention, an image recording device comprises a feeder configured to feed a first recording medium in a first direction, a curved guide defining a part of a first path and configured to guide upward the first recording medium fed by the feeder, an upper guide defining a part of the first path and configured to receive a leading edge of the first recording medium guided by the curved guide and to guide the first recording medium in a second direction which is substantially opposite to the first direction, an insertion guide defining a part of a second path and configured to guide a second recording medium inserted from an opening, a conveying unit disposed downstream of the upper guide in the second direction and configured to convey the first recording medium and the second recording medium, a supporting member configured to support a lower surface of each of the first recording medium and the second recording medium conveyed by the conveying unit, a recording unit configured to record an image on an upper surface of each of the first recording medium and the second recording medium supported by the supporting member, and a deflecting member comprising a first inclined surface which is inclined with respect to the second direction and is configured to deflect a leading edge of the second recording medium, guided by the insertion guide, upward toward the upper guide, such that the upper guide receives the leading edge of the second recording medium.

Other objects, features, and advantages will be apparent to persons of ordinary skill in the art from the following detailed description of the invention and the accompanying drawings.

BRIEF DESCRIPTION OF THE DRAWINGS

For a more complete understanding of the invention, the needs satisfied thereby, and the features and technical advantages thereof, reference now is made to the following descriptions taken in connection with the accompanying drawings.

DETAILED DESCRIPTION OF EMBODIMENTS

Figure 1:
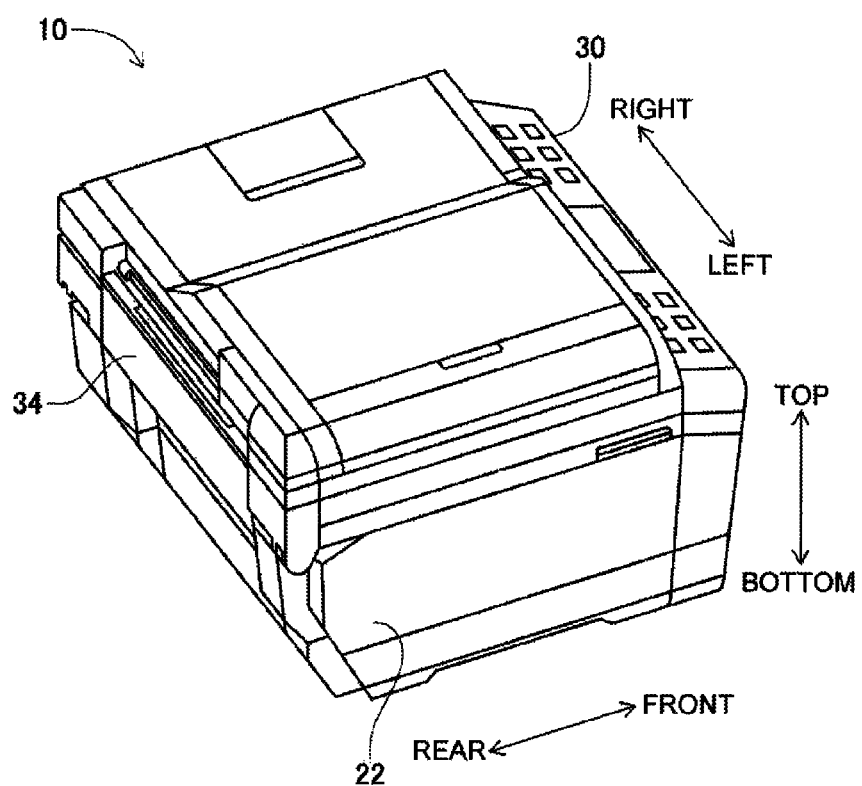
FIG. 1 is an external perspective view of a multi-function device (MFD), according to an embodiment of the invention.

Embodiments of the invention and their features and technical advantages may be understood by referring to FIGS. 1-8, like numerals being used for like corresponding parts in the various drawings.

Referring to FIGS. 1-5, a multi-function device (MDF) 10 will be described.

The MDF may have various functions such as a facsimile function, a printing function, a scanning function, and a copying function. The MDF 10 comprises an image recording device, e.g., a printer 22, disposed in a casing 20 and having a printing function. Descriptions about units for achieving the facsimile, scanning, and copying functions will be omitted because such units are not essential for the invention. In the following description, the expressions "front", "rear", "right", "left", "top", and "bottom" are used to define the various parts when the MDF 10 is disposed in an orientation in which it is intended to be used.

An operation panel 30 is disposed on an upper front surface of the MDF 10. The MDF 10 is operated based on inputs from the operation panel 30. A front wall of the casing 20 of the MDF 10 has an opening (not shown) through which a feed tray 32 is removably inserted into the casing 20 in a front-rear direction. The feed tray 32 is configured to hold recording media, e.g. sheets, of various sizes. A sheet is fed to a recording unit 42 from the feed tray inserted in the casing 20.

Figure 2:
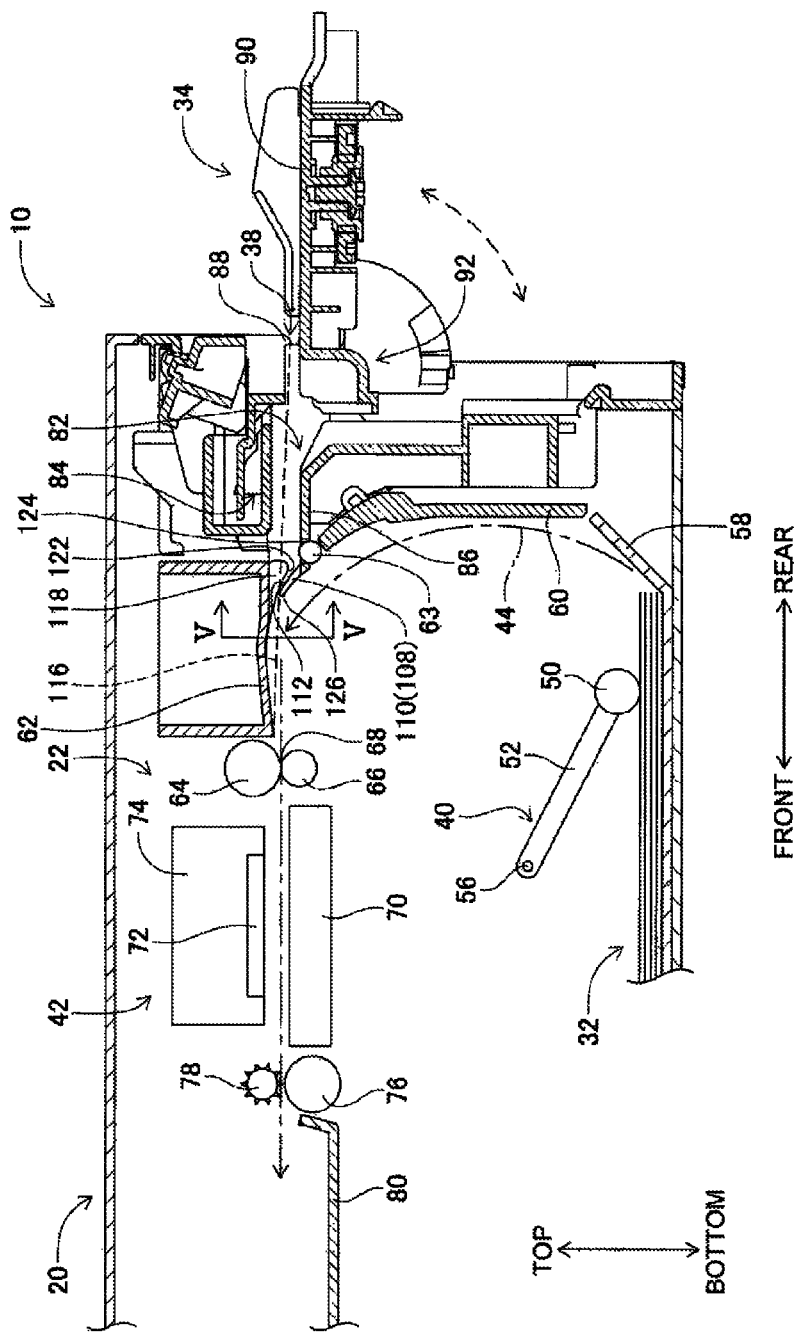
FIG. 2 is a vertical cross-sectional view schematically showing an inner structure of the MFD of FIG. 1.
Figure 3:
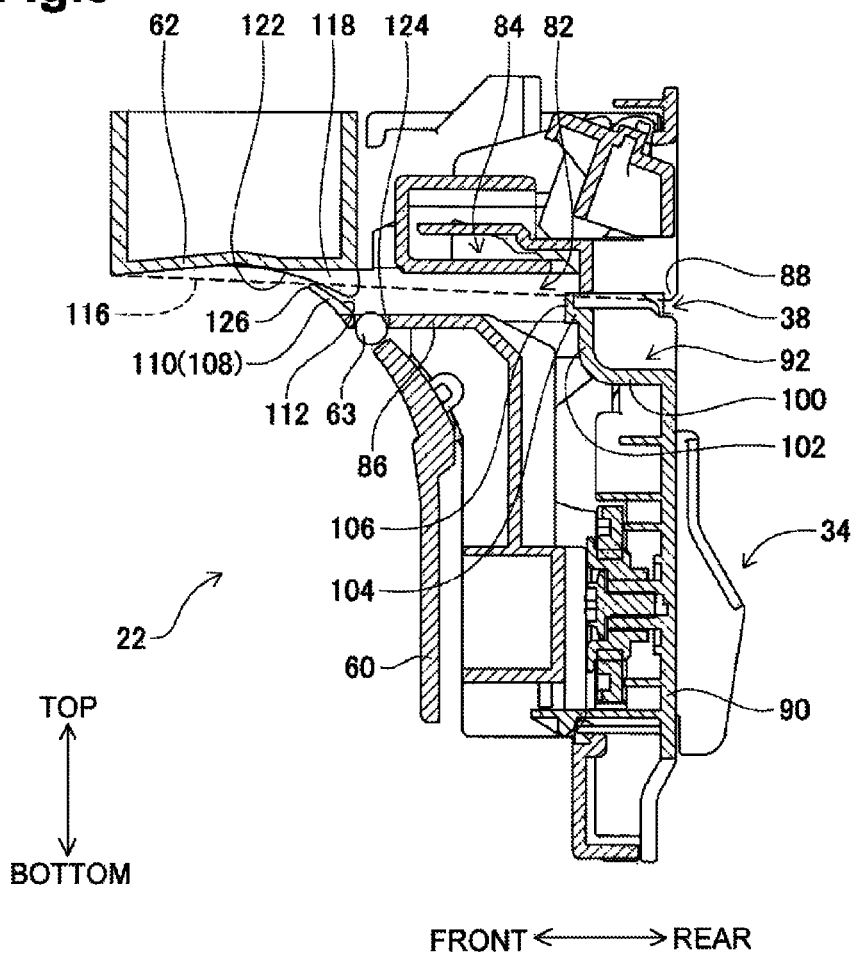
FIG. 3 is a partial cross-sectional view of the MDS of FIG. 1 when a manual feed tray is closed.
Figure 4:
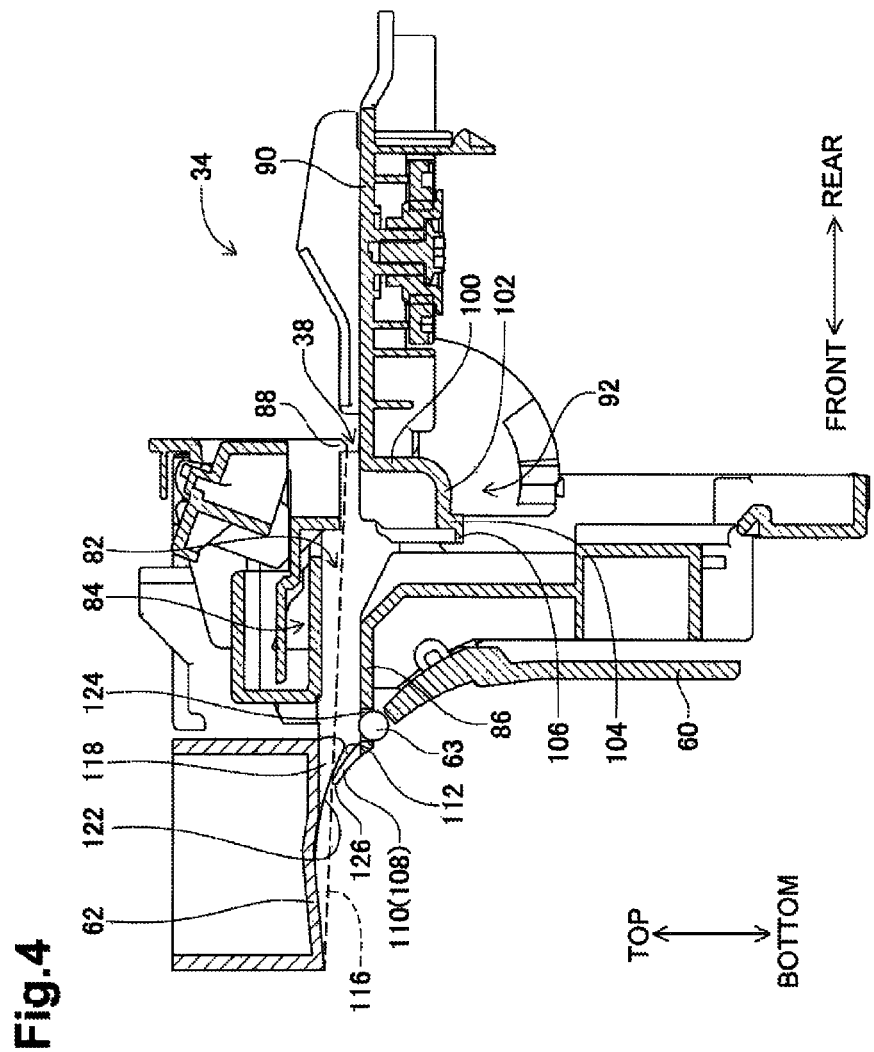
FIG. 4 is a partial cross-sectional view of the MDS of FIG. 1 when the manual feed tray is open.

A manual feed tray 34 is disposed at a rear side wall of the casing 20 and is configured to pivot about a pivot shaft (not shown) as shown by dotted arrows in FIG. 2. FIG. 1 shows the MDF 10 with the manual feed tray 34 closed while FIG. 2 shows the MDF 10 with the manual feed tray 34 open. FIG. 3 shows the MDF 10 with the manual feed tray closed while FIG. 4 shows the MDF 10 with the manual feed tray open. A front portion of the MDF 10 is omitted from FIG. 2. FIGS. 3 and 4 show the manual feed tray 34 and only a part of the casing 20 to which the manual feed tray 34 is attached.

When the manual feed tray 34 is open and in a holding position, the manual feed tray 34 is allowed to hold sheets of various sizes. When the manual feed tray 34 is closed, the manual feed tray 34 is retracted from the sheet holding position. The manual feed tray 34 is configured to move between the holding position and the retracted position. The side wall of the casing 20 to which a base end of the manual feed tray 34 is attached has an opening 38. The manual feed tray 34 is opened and a sheet is inserted by the user frontward from the opening 38 while the sheet is held on a sheet holding surface of the manual feed tray 34.

The printer 22 comprises a sheet feeder 40 configured to feed a sheet in a first direction, e.g., rearward, from the feed tray 32 to a first path, e.g., a first conveying path 44, and the recording unit 42 of the inkjet type configured to record an image on the sheet fed by the sheet feeder 40. The first conveying path 44 is defined in the printer 22 such that the sheet is conveyed along the first conveying path 44 from the sheet feeder 40 to the recording unit 42.

The sheet feeder 40 comprises a feed roller 50, a feed arm 52, and a transmission (not shown). The feed arm 52 is disposed above the feed tray 34 and is configured to pivot about a shaft 56. An end of the feed arm 52 is urged downward by its own weight and/or an elastic force of an elastic member. A feed roller 50 is rotatably supported at the end of the feed arm 52. When the feed arm 52 pivots downward, the feed roller 50 contacts a sheet stack on the feed tray 32.

The feed roller 50 is rotationally driven by a convey motor (not shown) via the transmission. When the feed roller 50 rotates in contact with the sheet stack, a topmost sheet is fed rearward. An inclined separation plate 58 is disposed at a rear end of the feed tray 32 and is configured to guide the sheet to the first conveying path 44.

The first conveying path 44 is a curved path extending from a vicinity of an upper end of the inclined separation plate 58 to the recording unit 42. The first conveying path 44 is defined by a curved guide, e.g., a first guide 60 having a curved shape and extending upward from the inclined separation plate 58, and an upper guide, e.g., a second guide 62 extending frontward from a vicinity of an upper end of the first guide 60.

The first guide 60 has a curved shape such that the sheet fed from the feed tray 32 is guided upward while being bent. An upper end of the first guide 60 is positioned frontward of a middle portion of the first guide 60. The first guide 60 guides the sheet in an upward and frontward direction at approximately 45 degrees with respect to the horizontal plane while bending the sheet. A roller 63 is disposed at the upper end portion of the first guide 60. The roller 63 is configured to freely rotate about an axis perpendicular to a sheet conveying direction and parallel to the horizontal direction. An outer circumferential surface of the roller 63 protrudes into the first conveying path 44 from the first guide 60. The roller 63 helps convey smoothly the sheet guided by and in contact with the first guide 60.

The second guide 62 extends frontward from a position above the upper end portion of the first guide 60, and a front end portion of the second guide 62 is positioned lower than a middle portion of the second guide 62. A leading edge of the sheet guided by the first guide 60 contacts the second guide 62. The second guide 62 guides the sheet in a frontward and downward direction at approximately 10 degrees with respect to the horizontal plane. The second guide 62 guides the sheet in a second direction, e.g., the frontward and downward direction, substantially opposite to the first direction in which the sheet feeder 40 feeds the sheet from the feed tray 32. The sheet is conveyed inside the casing from a lower portion to an upper portion along the first conveying path 44 while making a U-turn. The first guide 60 and the second guide 62 extend in a direction perpendicular to the drawing sheet plane of FIG. 2, i.e., in a right-left direction in FIG. 1.

A conveying unit, e.g., a first convey roller 64 and a pinch roller 66, are disposed in front of the second guide 62. The pinch roller 66 is configured to move toward and away from the first convey roller 64 and is urged by a coil spring (not shown) to intimately contact the first convey roller 64. A nip position 68 between the first convey roller 64 and the pinch roller 66 is positioned lower than the front end portion of the second guide 62. The sheet guided by the second guide member 62 is inserted obliquely downward into the nip position 68. The first convey roller 64 is rotationally driven by a convey motor (not shown) and cooperates with the pinch roller 66 to convey frontward the sheet inserted into the nip position 68.

A supporting member, e.g. a platen 70 disposed in front of the first convey roller 64 and the pinch roller 66 supports the sheet conveyed by the rollers 64, 66. The recording unit 42 is disposed above the platen 70 while leaving a predetermined distance therebetween. The sheet is conveyed between the platen 70 and the recording unit 42.

The recording unit 42 comprises a carriage 74 configured to reciprocate in a main scanning direction while carrying a recording head 72. The main scanning direction is a direction crossing a sheet conveying direction and is perpendicular to the sheet conveying direction at the recording unit 42. Cyan, magenta, yellow, and black inks are supplied from ink cartridges (not shown) to the recording head 72. Ink droplets of respective color inks are ejected from nozzles (not shown) formed at a lower surface of the recording head 72. Consequently, an image is recorded on an upper surface of the sheet supported on the platen 70. The recording unit 42 may be of the electrophotograpic type or other types, instead of the inkjet type.

A second convey roller 76 and a spur roller 78 are disposed in front of the recording unit 42 and the platen 70. The spur roller 78 is configured to move toward and away from the second convey roller 76 and is urged by a coil spring (not shown) to intimately contact the second convey roller 76. The spur roller 78 has an outer circumferential surface with projections and depressions so as not to deteriorate an image printed on the sheet. The second convey roller 76 is rotationally driven by a convey motor (not shown) and cooperates with the spur roller 78 to convey frontward the sheet having the image printed thereon. The sheet is discharged onto a discharge tray 80 disposed in front of the second convey roller 76 and the spur roller 78.

A second path, e.g., a second conveying path 82, is defined in the printer 22. A sheet inserted from the manual feed tray 34 is conveyed along the second conveying path 82 to an intermediate position of the first conveying path. The second conveying path 82 extends between the opening 38 formed in the side wall of the casing 20 and a gap formed between the first guide 60 and the second guide 62. An insertion guide comprises an upper section, e.g., an upper guide 84, and a lower section, e.g., a lower guide 86, and defines a part of the second conveying path. The upper guide 84 and the lower guide 86 extend in a direction perpendicular to the drawing sheet plane of FIG. 2, i.e., in the right-left direction in FIG. 1.

The upper guide 84 comprises, at a rear end portion thereof, a first protrusion 88 that protrudes downward. The first protrusion 88 is an example of an insertion protrusion. The manual feed tray 34 is disposed below the first protrusion 88. The manual feed tray 34 comprises a holding portion 90 for holding the sheet, and a recessed portion 92 formed continuously to the pivot shaft of the manual feed tray 34. The recessed portion 92 is recessed at right angles with the holding portion 90. When the manual feed tray 34 is open, the opening 38 is defined by the first protrusion 88 and an end of the holding portion 90, which is proximate to the recessed portion. The sheet inserted from the opening 38 is held on the holding portion 90. When a foreign object other than the sheet enters from the opening 38, the foreign object is likely to drop into the recessed portion 92. The recessed portion 92 prevents or reduces the foreign object from entering the inside of the casing 20.

As shown in FIG. 4, the recessed portion 92 comprises a first segment 100, a second segment 102, a third segment 104, and a fourth segment 106. When the manual feed tray 34 is open and in the holding position, the first segment 100 extends downward from a front end of the holding portion 90, and the second segment 102 extends frontward from a lower end of the first segment 100. The third segment 104 extends downward from a front end of the second segment 102, and the fourth segment 106 extends frontward from a lower end of the third segment 104. When the manual feed tray 34 is in the holding position, the opening 38 is not covered by the fourth segment 106. The fourth segment 106 is an example of a cover portion. As shown in FIG. 3, when the manual feed tray 34 is closed and in the retracted position, a corner between the second segment and the third segment opposes the upper guide 84 with a small interval therebetween. In this state, the fourth segment 106 extends upward from the front end of the third segment 104 and covers the opening 38. When the manual feed tray 34 is closed, the fourth segment 106 prevents dust or the like from entering the inside the casing 20.

The lower guide 86 comprises, at a front end portion thereof, a second protrusion 108 that protrudes upward. The second protrusion 108 is an example of a deflecting member. As shown in FIG. 5, which is a cross-sectional view taken along line V-V of FIG. 2, the second protrusion 108 comprises four ribs arranged in constant intervals in the right-left direction. As shown in FIGS. 2-4, each rib 110 protrudes obliquely upward and frontward and has a first inclined surface 112 extending from a free end of the rib 110 toward the opening 124, i.e., toward the rear. Thus, the first inclined surface 112 of each rib 10 guides the sheet inserted from the opening 38 obliquely upward and frontward smoothly. The first inclined surface 112 is inclined respect to the second direction in which the second guide 62 guides the sheet, and directs a leading edge of the sheet, guided by the lower guide 84, upward toward the second guide 62, such that the leading edge of the sheet contacts the second guide 62.

In FIGS. 2-4, a dotted line 116 shows a path of the sheet inserted from the opening 38 and guided by the first inclined surface 112 of each rib 10. The dotted line 116 is a straight line extending between a lower end of the first protrusion 88 and an upper end of the rib 110, as viewed in the right-left direction. The dotted line 116 extends in a sheet inserting direction.

As shown in FIGS. 2-4, the dotted line 116 strikes the second guide 62. A front or leading edge of the sheet inserted into the first conveying path 44 via the second conveying path 82 contacts the second guide 62. When the sheet is inserted further along the first conveying path 44, the leading edge of the sheet is guided obliquely downward and frontward by the second guide 62. Then the sheet is inserted obliquely downward and frontward into the nip position 68 between the first convey roller 64 and the pinch roller 66. The rollers 64, 66 convey the sheet between the recording unit 42 and the platen 70. Subsequent operations by the recording unit 42 and the like are the same as those when the sheet is fed from the manual tray 32, and thus a description thereof will be omitted.

In the printer 22 configured as described above, each of the sheet fed from the feed tray 32 and the sheet fed from the manual feed tray 34 is inserted obliquely downward into the nip position 68. Thus, each of the sheet fed from the feed tray 32 and the sheet fed from the manual tray 34 is conveyed into and between the recording unit 42 and the platen 70 while being urged toward the platen 70 and, in this state, an image is recorded on the sheet. This prevents or reduces the sheet fed from the feed tray 32 or the manual feed tray 34 from floating during image recording, and an image is properly recorded on the sheet.

Figure 5A:
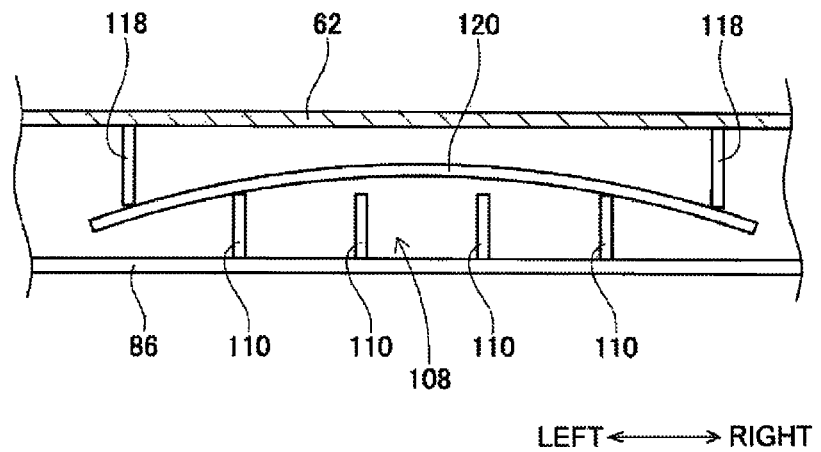
FIGS. 5A and 5B are cross-sectional views of the MDF taken along line V-V of FIG. 2.

As shown in FIG. 5A, a third protrusion, e.g., a pair of ribs 118, is formed at a rear end portion of the second guide 62 and protrudes downward. The rib 118 is an example of an auxiliary protrusion. The rear end portion of the second guide 62 opposes the second protrusion 108. Four ribs 110 of the second protrusion 108 are interposed between the pair of ribs 118 in the right-left direction. Lower ends of the ribs 118 are positioned lower than upper ends of the ribs 110 of the second protrusion 108. The ribs 110 pushes up a central portion of the sheet and the ribs 118 pushes down opposite end portions of the sheet in the right-left direction. The rear end portion of the second guide 62 and the upper guide 84 define, as the upper section, a part of the second conveying path 82.

Figure 5B:
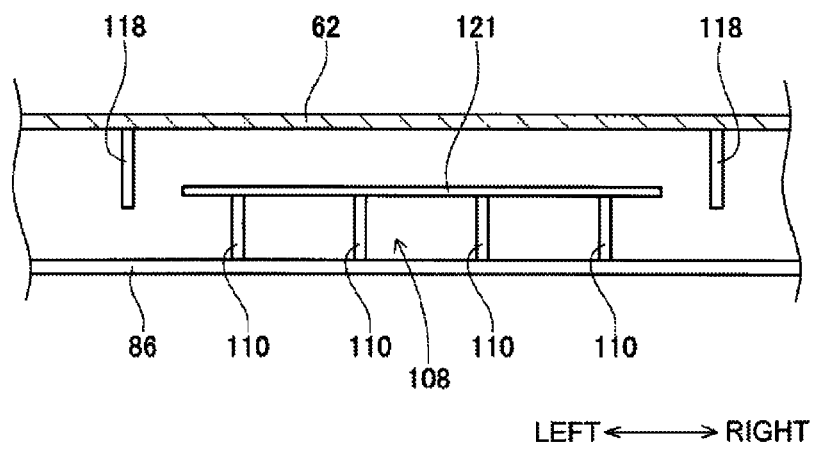

As shown in FIG. 5A, the sheet 120 between the ribs 110 and the ribs 118 is deformed such that a central portion thereof protrudes upward. In this state, a leading edge of the sheet 120 contacts the second guide 62 which in turn guides the leading edge of the sheet 120 properly toward the nip position 68 between the first convey roller 64 and the pinch roller 66. A distance between the pair of ribs 118 is set to be longer than a width or a dimension in the right-left direction of the first convey roller 64 and a width or a dimension in the right-left direction of the pinch roller 66. Thus, the opposite ends of the sheet which are deformed downward by the ribs 18 are not pinched by the first convey roller 64 and the pinch roller 66. Because the sheet is conveyed between the recording unit 42 and the platen 70 with its opposite ends in the right-left direction deformed toward the platen 70, floating of the sheet is reliably prevented during image recording. As shown in FIG. 5B, when a width of the sheet, i.e., a dimension of the sheet in a direction perpendicular to the sheet conveying direction is shorter than the distance between the ribs 118, the sheet 121 does not contact the pair of ribs 118 and is supported by the ribs 110.

As shown in FIGS. 2-4, each of the pair of ribs 118 formed at the rear end portion of the second guide 62 protrudes obliquely downward and rearward and has a second inclined surface 122 extending from a lower end portion of the rib 118 toward a front end portion of the second guide 62, i.e., toward the front. In other words, the second inclined surface 122 is inclined downward to an upstream end of the rib 118 in the second direction in which the second guide 62 guides the sheet. The second inclined surface 122 is curved so as to smoothly guide the sheet even when the sheet fed from the feed tray 32 and guided by the first guide 60 and the second guide 62 contacts the ribs 118.

The outer circumferential surface of the roller 63 disposed in the first guide member 60 protrudes into the second conveying path 82 through the opening 124 formed in the lower guide 86. The roller 63 helps convey smoothly the sheet guided by and in contact with the lower guide 86. The roller 63 helps convey smoothly the sheet along the second conveying path 82 as well as the sheet along the first conveying path 44.

The upper end of each rib 110 of the lower guide 86 extends to a higher position than the first guide 60 which defines a part of the first conveying path 44. Each rib 110 has an upper surface which defines a part of the second conveying path 82 and a surface 126 opposite to the upper surface and facing obliquely downward and frontward. The surface 126 functions as a curved surface continued from the upper end portion of the first guide 60 and reliably guides the sheet fed from the feed tray 32 toward the second guide 62.

Figure 6:
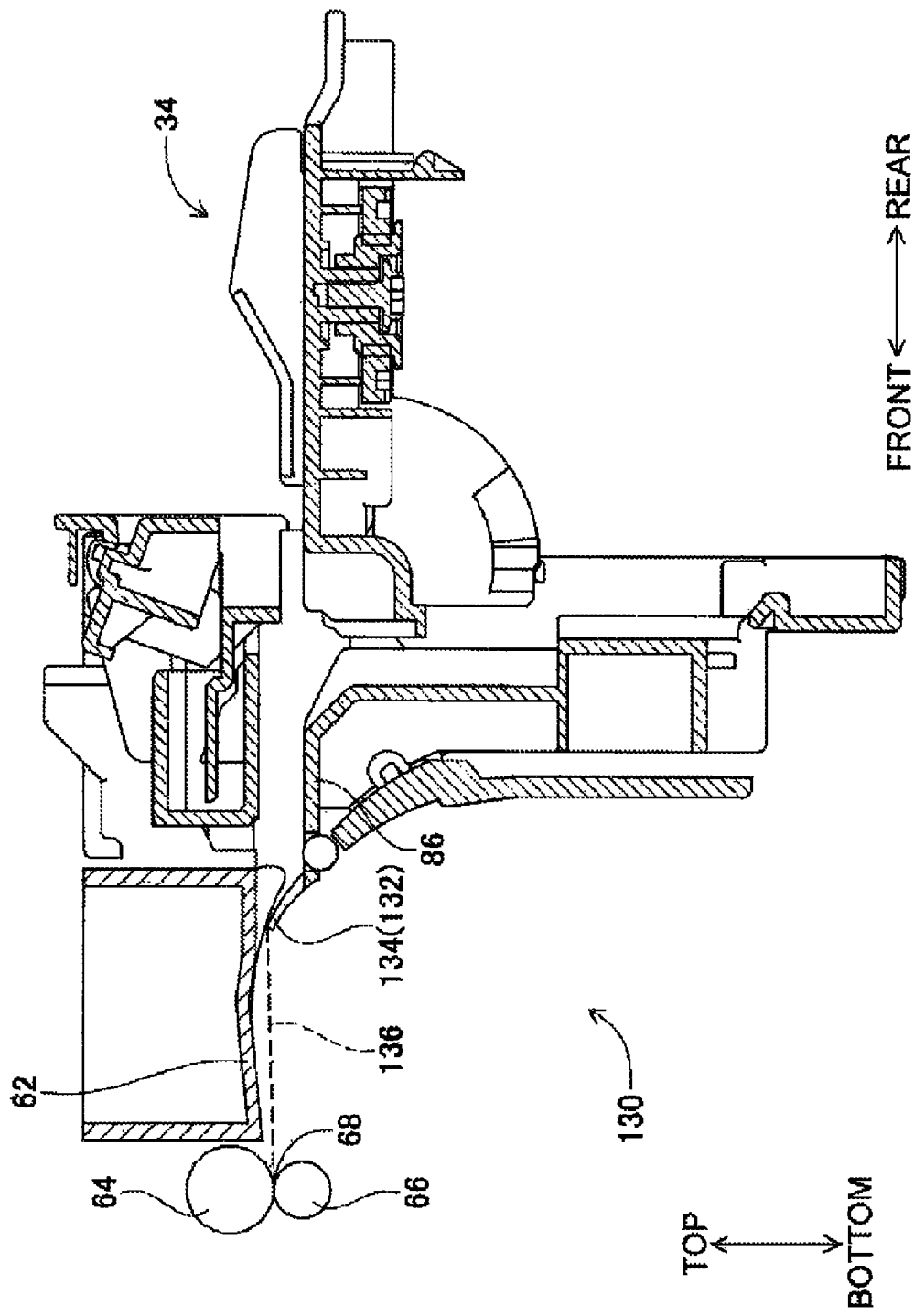
FIG. 6 is a vertical cross-sectional view schematically showing an inner structure of a MFD according to another embodiment of the invention.

Although, in the printer 22 of the MDF 10 according to the above-described embodiment, the upper end of each rib 110 of the second protrusion 108 is positioned lower than the nip position 68, the upper end of each rib 110 may be positioned as high as or higher than the nip position 68. Referring to FIG. 6, an image recording device, e.g., a printer 130 according to another embodiment will be described. The printer 130 is configured similarly to the printer 22 except for ribs 134 of a second protrusion 132. Like numerals denote like parts and the description of like parts will be omitted.

The second protrusion 132 is formed at a front end portion of the lower guide 86 so as to protrude upward. The second protrusion 132 comprises four ribs 134 (only one of the ribs 134 is shown in FIG. 6) arranged at constant intervals in the right-left direction. Although the 134 has a similar shape to that of the rib 110 in the above-described embodiment, a length of the rib 134 in the top-bottom direction is longer than that of the rib 110 and an upper end of the rib 134 is positioned higher than the nip position 68.

Each rib 134 prevents or reduces the sheet from floating during image recording. More specifically, when the sheet inserted from the manual feed tray 34 is inserted along the second guide 62 into the nip position 68 and is conveyed by the first convey roller 64 and the pinch roller 66, the sheet may become separated from the second guide 62. In this case, the first convey roller 64 and the pinch roller 66 pulls the sheet forward such that the sheet extends in a straight line (shown by a dotted line 136 in FIG. 6) between the nip position 68 and the upper ends of the ribs 134, as viewed in the right-left direction. The sheet is positioned on a flat plane containing the nip position 68 and the upper ends of the ribs 134. The flat plane is inclined downward toward the nip position 68. Thus, the sheet positioned on the flat plane is conveyed into and between the recording unit 42 and the platen 70 while being urged toward the platen 70. Even when the sheet is separated from the second guide 62, floating of the sheet is prevented during image recording.

Figure 7:
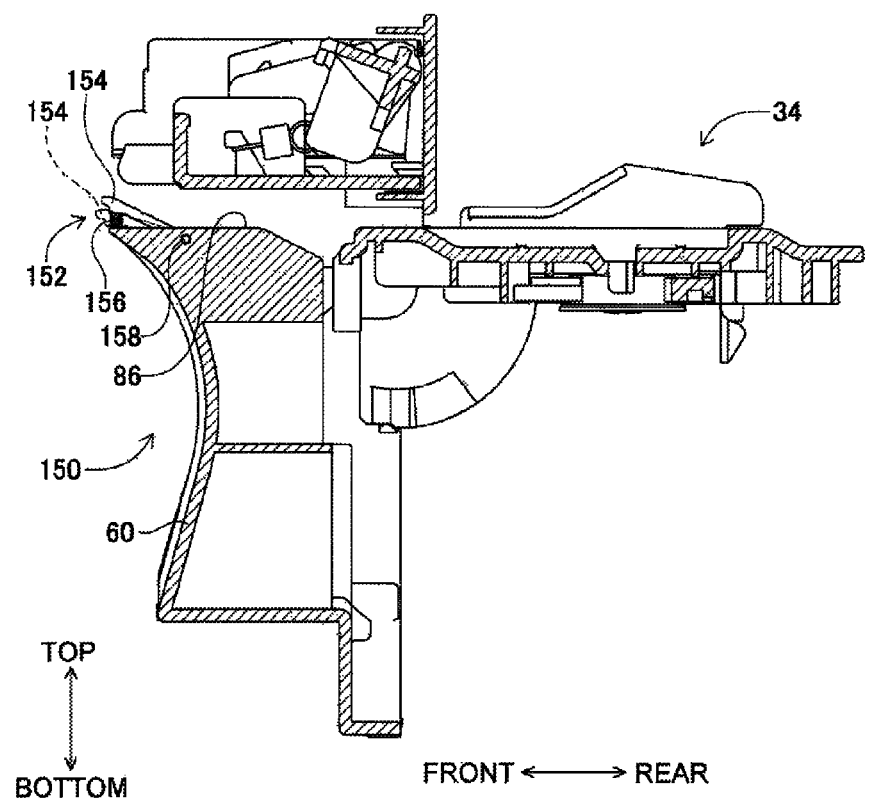
FIG. 7 is a vertical cross-sectional view schematically showing an inner structure of a MFD according to another embodiment of the invention.
Figure 8:
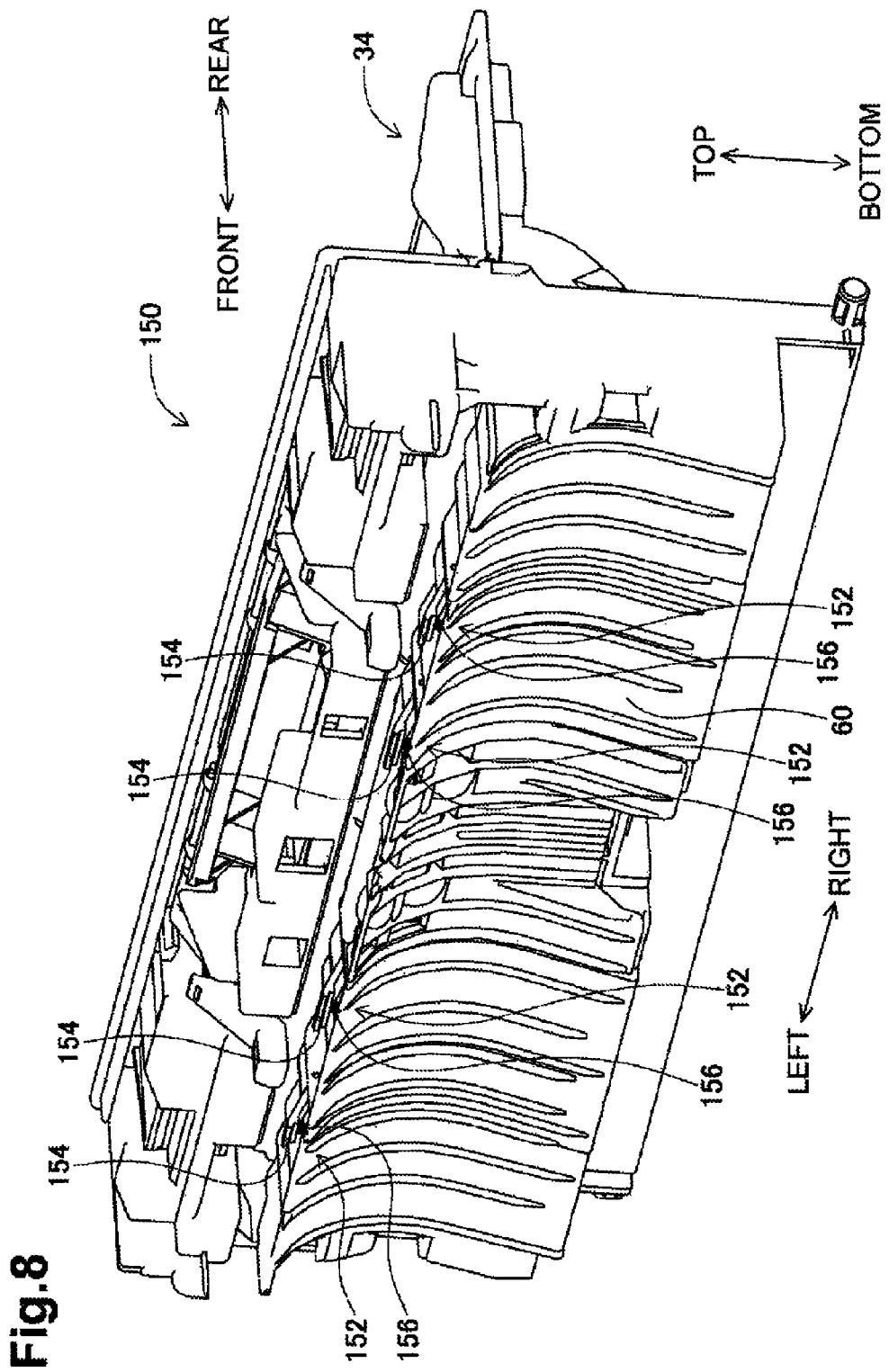
FIG. 8 is a perspective view showing an inside of the MDF of FIG. 7.

Although the position of an upper or protruding end of the second protrusion 108 of the printer 22 and the position of an upper or protruding end of the second protrusion 132 of the printer 130 do not change, the position of the upper or the protruding end of the second protrusion 108, 132 may change. Referring to FIGS. 7 and 8, an image recording device, e.g., a printer 150 according to another embodiment will be described. The printer 150 is configured similarly to the printer 22 except for a second protrusion 152. Like numerals denote like parts and the description of like parts will be omitted.

A second protrusion 152 is formed at a front end portion of the lower guide 86 of the printer 150 so as to protrude upward. The second protrusion 152 comprises four pivoting members 154 (only one of the pivoting members 154 is shown in FIG. 7), and four elastic members 156 (only one of the elastic members 156 is shown in FIG. 7) provided respectively for the pivoting members 154. The elastic members 156 each are an example of an urging member. Each of the pivoting members 154 is disposed at a front end portion of the lower guide 86. The pivoting member 154 pivots about a pivot shaft 158 at a base end thereof while a free end of the pivoting member 154 extends obliquely upward and frontward. The elastic member 156 urges the pivoting member 154 clockwise in FIG. 7 toward a first position, e.g., a position shown by a solid line in FIG. 7, from a second position, e.g., a position shown by a dotted line in FIG. 7.

In the printer 150 configured as described above, the upper end position of the second protrusion 152 changes depending on the hardness, i.e., the rigidity of a sheet fed from the manual feed tray 34. More specifically, when a sheet having a relatively high rigidity is fed from the manual feed tray 34, the sheet contacts the pivoting members 154 which in turn pivot against the elastic force of the elastic members 156. Each elastic member 154 pivots counterclockwise in FIG. 7 by the sheet such that the free end thereof is lowered to the position shown by the dotted line in FIG. 7. When a sheet having a relatively low rigidity is fed from the manual feed tray 34, the sheet contacts the pivoting members 154 but the pivoting members 154 hardly pivot. Each pivoting member 154 hardly pivots counterclockwise in FIG. 7 by the sheet, and the free end position of the pivoting member 154 hardly changes.

In the printer 150, as the rigidity of the sheet becomes higher, the free end position of the pivoting member 154, i.e., the upper end position of the second protrusion 152, becomes lower. As the upper end position of the second protrusion 152 becomes lower, the inclination angle, with respect to the horizontal plane, of the straight line extending between the upper end of the second protrusion 152 and the lower end of the first protrusion 88 becomes smaller. Consequently, as the inclination angle becomes smaller, the contact position of the leading edge of the sheet fed from the manual feed tray 34 with the second guide 62 moves closer to the front end of the second guide 62.

As the contact position of the leading edge of the sheet with the second guide 62 becomes closer to the front end of the second guide 62, deformation of the sheet by the second guide 62 becomes smaller. On the contrary, as the contact position of the sheet with the second guide 62 becomes farther from the front end of the second guide 62, deformation of the sheet by the second guide 62 becomes larger. That is, as the upper end position of the second protrusion 152 becomes lower, i.e., as the rigidity of the sheet becomes higher, deformation of the sheet becomes smaller. Consequently, excessive deformation of a sheet having a relatively high rigidity may be suppressed in the printer 150.

Although, in the above-described embodiments, the first protrusion 88 is disposed in proximity of the opening 38, the first protrusion 88 may be dispose at any position on an upstream side of the second protrusion 108, 132, 152. For example, the first protrusion 88 may be disposed at a middle portion of the upper guide 84.

In the embodiment depicted in FIGS. 2 and 4, the straight line 116 extending between the lower end of the first protrusion 88 and the upper end of the second protrusion 108 strikes the downstream end portion of the second guide 62. However, the position of at least one of the first protrusion 88 and the second protrusion 108 may be changed such that the straight line 116 strikes a meddle portion of the second guide 62 in the sheet conveying direction. For example, the second protrusion 108 may be disposed upstream of the first protrusion 88 in the sheet conveying direction, and the upper end of the second protrusion 108 may be positioned higher than the lower end of the first protrusion 88.

While the invention has been described in connection with embodiments of the invention, it will be understood by those skilled in the art that variations and modifications of the embodiments described above may be made without departing from the scope of the invention. Other embodiments will be apparent to those skilled in the art from a consideration of the specification or practice of the invention disclosed herein. It is intended that the specification and the described examples are considered merely as exemplary of the invention, with the true scope of the invention being defined by the following claims.

What is claimed is:

1. An image recording device comprising:
   a feeder configured to feed a first recording medium in a first direction;
   a curved guide defining a part of a first path and configured to guide upward the first recording medium fed by the feeder along the first path;
   an upper guide defining a part of the first path and configured to receive a leading edge of the first recording medium guided by the curved guide and to guide the first recording medium along the first path towards a second direction;

an insertion guide defining a part of a second path and configured to guide a second recording medium inserted from an opening along the second path;

a conveying unit disposed downstream of the upper guide in the second direction along the first and second paths and configured to convey the first recording medium and the second recording medium;

a supporting member configured to support a lower surface of each of the first recording medium and the second recording medium conveyed by the conveying unit;

a recording unit configured to record an image on an upper surface of each of the first recording medium and the second recording medium supported by the supporting member, the recording unit is downstream from the conveying unit along each of the first and second paths; and a deflecting member comprising a first inclined surface which is inclined with respect to the second direction and projecting upward toward the upper guide, the deflecting member is downstream from the insertion guide and is configured to deflect a leading edge of the second recording medium, guided by the insertion guide, upward toward the upper guide, such that the upper guide receives the leading edge of the second recording medium, wherein the conveying unit is configured to convey each of the first recording medium and the second recording medium to the recording unit along the second direction that is opposite to the first direction, wherein the insertion guide comprises:

a lower section configured to support the lower surface of the second recording medium inserted from the opening, and an upper section opposing the lower section and comprising an insertion protrusion which protrudes toward the lower section, and wherein the lower section comprises the deflecting member which protrudes toward the upper section, and an upper end of the deflecting member is higher than an lower end of the insertion protrusion such that a straight line extending between the lower end of the insertion protrusion and the upper end of the deflecting member strikes the upper guide.

2. The image recording device according to claim 1, wherein the deflecting member further comprises an opposite surface which is opposite from the first inclined surface and curved, and is configured to guide the first recording medium, guided by the curved guide, upward toward the upper guide.

3. The image recording device according to claim 1, wherein an upper end of the deflecting member is higher than a nip position in which the conveying unit nips each of the first recording member and the second recording member.

4. The image recording device according to claim 1, wherein a downstream end of the upper guide in the second direction is higher than a nip position in which the conveying unit nips each of the first recording member and the second recording member.

5. The image recording device according to claim 1, wherein the deflecting member is configured to move between a first position and a second position, and an upper end of the deflecting member in the second position is lower than the upper end of the deflecting member in the first position, and wherein the image recording device further comprises an urging member configured to urge the deflecting member toward the first position.

6. The image recording device according to claim 1, wherein the insertion protrusion is disposed at an end of the upper section of the insertion guide and defines a part of the opening.

7. The image recording device according to claim 1, further comprising a manual feed tray configured to move between a holding position for holding the second recording medium to be inserted from the opening into the insertion guide, and a retracted position retracted from the holding position, wherein the manual feed tray comprises a cover portion configured to cover the opening when the manual feed tray is in the retracted position and to open the opening when the manual feed tray is in the holding position.

8. An image recording device comprising:

a feeder configured to feed a first recording medium in a first direction;

a curved guide defining a part of a first path and configured to guide upward the first recording medium fed by the feeder along the first path;

an upper guide defining a part of the first path and configured to receive a leading edge of the first recording medium guided by the curved guide and to guide the first recording medium along the first path towards a second direction;

an insertion guide defining a part of a second path and configured to guide a second recording medium inserted from an opening along the second path;

a conveying unit disposed downstream of the upper guide in the second direction along the first and second paths and configured to convey the first recording medium and the second recording medium;

a supporting member configured to support a lower surface of each of the first recording medium and the second recording medium conveyed by the conveying unit;

a recording unit configured to record an image on an upper surface of each of the first recording medium and the second recording medium supported by the supporting member, the recording unit is downstream from the conveying unit along each of the first and second paths;

a deflecting member comprising a first inclined surface which is inclined with respect to the second direction and projecting upward toward the upper guide, the deflecting member is downstream from the insertion guide and is configured to deflect a leading edge of the second recording medium, guided by the insertion guide, upward toward the upper guide, such that the upper guide receives the leading edge of the second recording medium; and a roller which is configured to rotate about an axis perpendicular to the second direction and parallel to a horizontal direction and which comprises an outer circumferential surface protruding into the second path from the insertion guide and protruding into the first path from the curved guide, wherein the conveying unit is configured to convey each of the first recording medium and the second recording medium to the recording unit along the second direction that is opposite to the first direction.

9. An image recording device comprising:

a feeder configured to feed a first recording medium in a first direction;

a curved guide defining a part of a first path and configured to guide upward the first recording medium fed by the feeder along the first path;

an upper guide defining a part of the first path and configured to receive a leading edge of the first recording medium guided by the curved guide and to guide the first recording medium along the first path towards a second direction;

an insertion guide defining a part of a second path and configured to guide a second recording medium inserted from an opening along the second path;

a conveying unit disposed downstream of the upper guide in the second direction along the first and second paths and configured to convey the first recording medium and the second recording medium;

a supporting member configured to support a lower surface of each of the first recording medium and the second recording medium conveyed by the conveying unit;

a recording unit configured to record an image on an upper surface of each of the first recording medium and the second recording medium supported by the supporting member, the recording unit is downstream from the conveying unit along each of the first and second paths; and a deflecting member comprising a first inclined surface which is inclined with respect to the second direction and projecting upward toward the upper guide, the deflecting member is downstream from the insertion guide and is configured to deflect a leading edge of the second recording medium, guided by the insertion guide, upward toward the upper guide, such that the upper guide receives the leading edge of the second recording medium, wherein the conveying unit is configured to convey each of the first recording medium and the second recording medium to the recording unit along the second direction that is opposite to the first direction, and wherein the insertion guide comprises a pair of auxiliary protrusions protruding downward and disposed on opposite sides of the deflecting member in a direction perpendicular to the second direction and parallel to a horizontal direction, and wherein lower ends of the auxiliary protrusions are lower than an upper end of the deflecting member.

10. The image recording device according to claim 9, wherein each of the auxiliary protrusions comprises a second inclined surface which is inclined downward to an upstream end of the auxiliary protrusion in the second direction.

11. The image recording device according to claim 10, wherein the second inclined surface of each of the auxiliary protrusions comprises a curved portion configured to guide the first recording medium, guided by the curved guide, to the upper guide.

* * * * *